W. N. Whiteley Jr,
Harvester Rake.
No. 57419.    Patented Aug. 21 1866.
Sheet 1. 3 Sheets
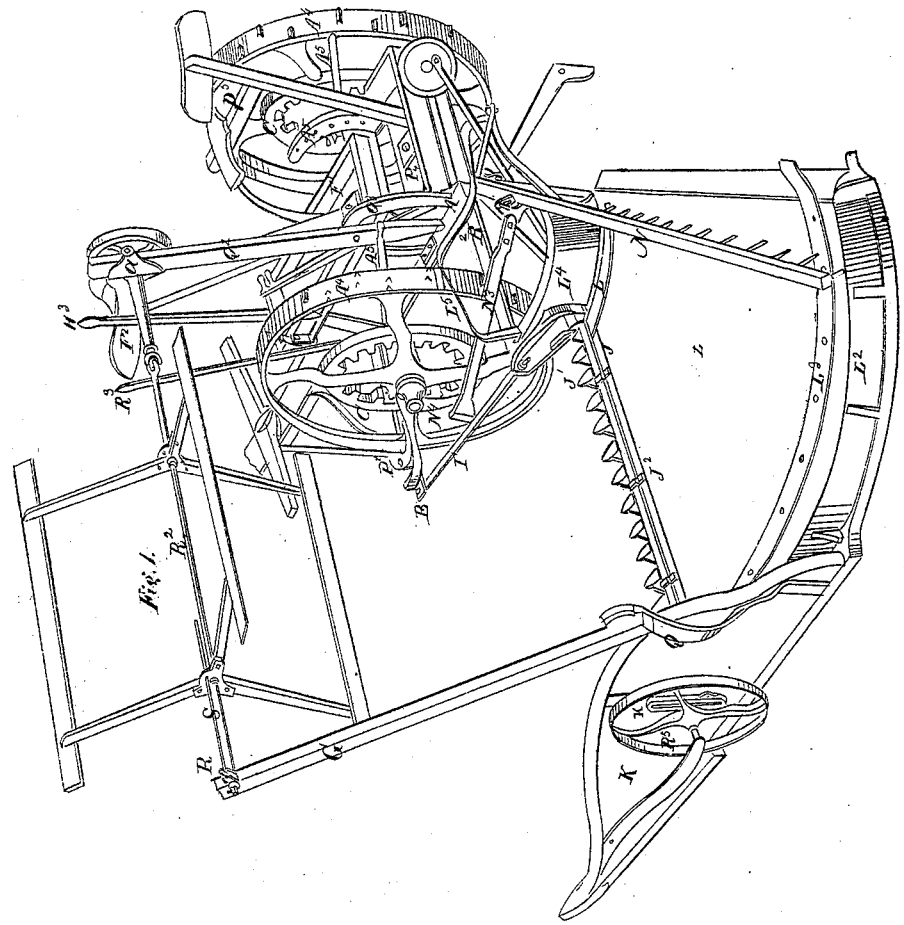
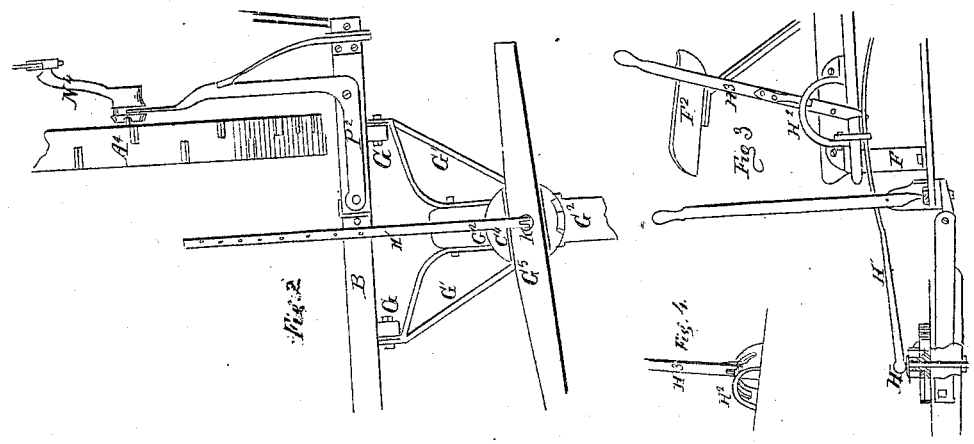

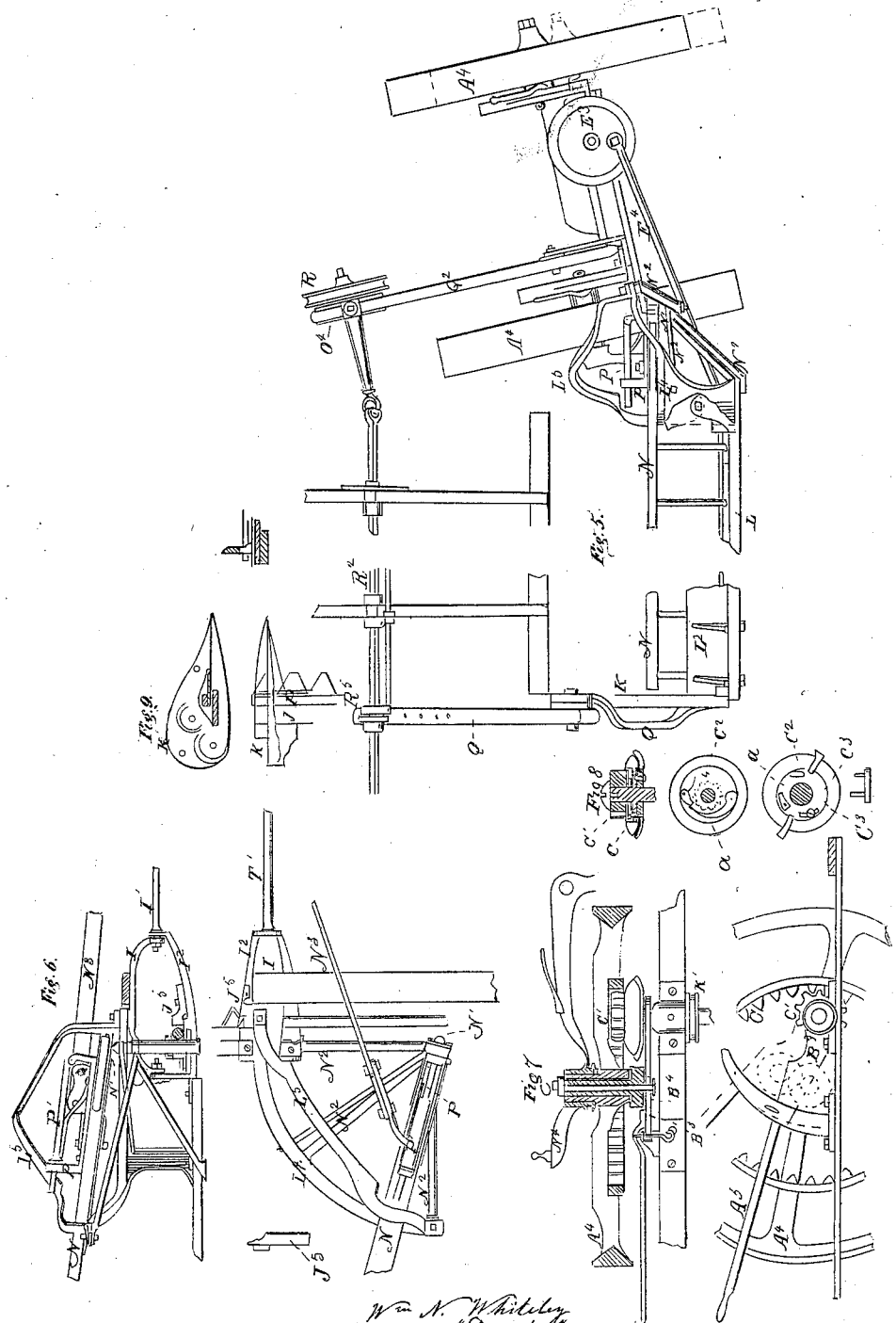

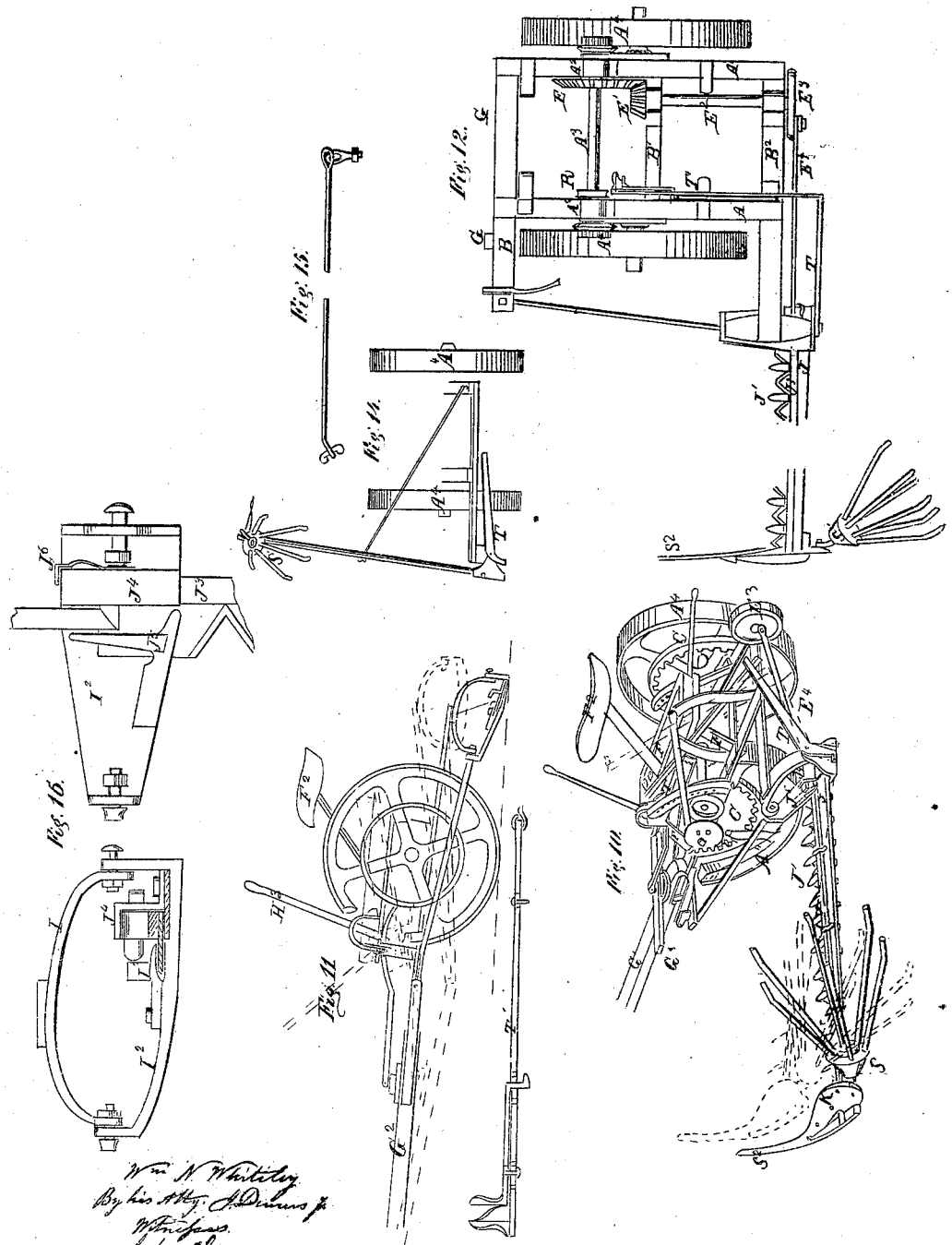

UNITED STATES PATENT OFFICE.

WILLIAM N. WHITELEY, OF SPRINGFIELD, OHIO.

IMPROVEMENT IN HARVESTERS.

Specification forming part of Letters Patent No. 57,419, dated August 21, 1866.

*To all whom it may concern:*

Be it known that I, WILLIAM N. WHITELEY, of Springfield, Clarke county, State of Ohio, have invented certain new and useful Improvements in Harvesting-Machines for Harvesting Grain, Grass, &c.; and I do hereby declare the following description and accompanying drawings are sufficient to enable any person skilled in the art or science to which it most nearly appertains to make and use my said invention or improvements without further invention or experiment.

My improvements belong to that class of harvesting-machines in which the finger-bar is hinged to the main frame and projects out from it, known as "side-draft machines."

The object of my invention is to make a combined self and hand raking reaper and mower with a hinged finger-bar and two driving and supporting wheels.

The nature of my invention consists, first, in a reversible adjustable driver's seat, with an adjustable reversible standard located on the main frame between the driving-wheels; second, in providing a plate turning loose on the pinion-shaft with two or more handles, and with an eccentric slot or edge to release and hold the pawl from the ratchet which locks the pinion to its shaft when desired; third, arranging, in combination with a harvesting-machine having a hinged cutting apparatus and a removable self-raking attachment of a raker's stand, whereby the attendant is enabled to remove the gavels by hand when the self-raking attachment is removed; fourth, in combining with a harvester-frame mounted on two driving-wheels a divider-platform and finger-bar hinged to the frame, and combined with a reel which acts independent of the rake, which rake moves the grain-heads foremost at intervals sidewise and backward over the platform; fifth, in combining with a harvesting-machine having a hinged finger-bar a rake and reel which act independent of each other, the rake moving the grain-heads foremost sidewise and backward independent of the reeling mechanism; sixth, in combining with a reel arranged to traverse on its shaft a sleeve and connecting-rod, to adjust and hold the reel properly over the cutters through all the vibrations of the finger-bar.

To enable others skilled in the art to make and use my improvements, I will proceed to describe their construction and operation, referring to the accompanying drawings, in which the same letters indicate like parts in each of the figures.

Figure 1 is a perspective view of the machine complete as arranged for reaping, with self and hand raking attachment. Fig. 2 is a plan of the front of the frame and parts connected to it. Fig. 3 is a side elevation of the same. Fig. 4 is a perspective view of the stand $H^2$. Sheet 2, Fig. 5 shows the platform, rake, and reel horizontal and the main frame inclined. Fig. 6 shows a portion of the rake with its arch or guide and bow, with the supports of its pivots. Fig. 7 is a section and elevation of one of the driving-wheels, with the sector-plate and spindle on which it turns and the rake-crank on the hub of the wheel; Fig. 8 is a section and elevation of the pinion and the devices for locking it to and releasing it from its shaft. Fig. 9 is an elevation, plan, and section of the shoe at the outer end of the finger-bar. Sheet 3, Fig. 10 shows the machine as a mower, with the reaping fixtures removed. Fig. 11 is a side elevation, showing the shoe and finger-bar on the ground in black lines and elevated in red lines. Fig. 12 is a plan of a portion of the machine arranged for mowing. Fig. 13 is a section of one of the levers which raises the finger-bar. Fig. 14 shows the machine with the finger-bar turned up and fastened to travel from farm to farm or elsewhere. Fig. 15 shows the rod which holds the finger-bar when it is turned up. Fig. 16 is an elevation and plan of the main shoe and parts working in it.

In the accompanying drawings, A and A' are the side rails, and B the front bar, B' the center and $B^2$ the rear bar, all of which are firmly fastened to the under sides of the rails to form the main frame.

$A^2$ are boxes fastened to the rails for the pinion-shaft $A^3$ to turn in, as shown in Fig. 12. $B^3$ are sector-plates which vibrate on the ends of the boxes $A^2$, and their rear ends traverse in grooves in the stands $A^3$, fastened to the rails. The hollow spindle $B^4$, on which the driving and carrying wheels $A^4$ turn, are fastened to the sector-plates by bolts, as shown in Fig. 7.

The wheels $A^4$ are made in the form shown, with long hubs, one end of which turns in a groove in the hub of the spindle, and the treads of these wheels are provided with projections extending about half-way across, arranged alternately.

The levers $A^5$ are fastened to the sector-plates, and the driver, by seizing one of the levers and working it up or down, can raise or lower the frame on either wheel; and the standards $A^3$, in which the sector-plates traverse, are provided with a series of holes, in which pins may be inserted to hold the sectors and frame the required height.

The driving-gears C are fastened to the spokes of the wheels $A^4$ and turn the pinions $C'$, Figs. 7 and 8, which turn loose on the shaft $A^3$, and are provided with ratchets $C^4$ for the pawl, fastened to the disk $C^2$ and pressed against the ratchet by the spring $a$, which disk $C^2$ is fastened to the shaft $A^3$ to turn it and operate the cutters. The disk $C^2$ has a recess in one side for the ratchet, pawl, and spring, and a pin in the pawl extends through the disk into the slot $a'$ in the plate $C^3$ on the opposite side of the disk from the pinion, and the side of the slot $a'$ next to the shaft is eccentric, and the plate $C^3$ has two arms, by which it may be turned to raise the pawl and release the pinion to let the machine travel without operating the cutting apparatus. The plate $C^3$ comes close to the frame and is partly covered by it; hence it is important that this plate should have two or more arms or handles, so that some one of them may be accessible at all times.

The pinion-disk and plate, with the parts attached, are shown in Fig. 8 in plan and section. The pinion-shaft $A^3$ carries the bevel-gear E, which turns the pinion $E'$ and shaft $E^2$, which turns in boxes fastened to the bars $B'$ and $B^2$, and carries the fly-wheel $E^3$, which has a crank-pin in it for the link $E^4$, which traverses the cutter-bar and cutters.

The brackets F are fastened to the rails A and $A'$, to support the foot-box $F'$ for the driver, and in the bottom of the foot-box there is a long slot for the bolt which holds the spring for the driver's seat $F^2$, so that it may be set forward or back or adjusted; and when the machine is used for reaping the seat is arranged as shown at Fig. 1; but when the machine is to be used for mowing the spring is reversed in the box and the seat on the spring and set in the position shown in Figs. 10 and 11.

The ears G are fastened to the front bar B to carry the hounds $G'$, which hold the tongue $G^2$, and the circular plate $G^3$ is fastened to the tongue and provided with lugs projecting into scores in the plate $G^4$, which turns on the top of $G^3$, and has the double-tree $G^5$ fastened to it. The lugs on the plate $G^3$ and the scores in the plate $G^4$ limit the vibrations of the double-tree and prevent one animal from drawing far ahead of the other.

The bolt H, which passes through the double-tree, plates, and tongue, has the link $H'$ hinged to it, which extends back through a slot in the stand $H^2$, fastened to the side of the foot-box, and made in the form shown in the drawings in Figs. 3 and 4, for the lever $H^3$ to work in, which vibrates on a bolt in the stand $H^2$ and traverses the link $H'$ to raise and lower the rear of the frame and heel of the finger-bar. There is a lug on the side of the lever $H^3$ which catches in the scores in the arc of the stand $H^2$, and there is a spring on the opposite side of the lever to press the lug into the scores, so that the driver can press the lever against the spring and release the lug from the score and move it opposite the next or another score and draw the lug into it without stopping the machine.

The front bar, B, and the rear bar, $B^2$, extend out beyond the wheel $A^4$ on the left side of the machine, to support the hanging bracket I, fastened to the under side of the latter, and connected to the former by the rod $I'$, which forms the pivot for the fore end of the main shoe $I^2$. The rear end of this shoe vibrates on the bolt which connects it to the rear end of the hanging bracket I. There is a score across the rear part of the shoe $I^2$, in which score the end of the finger-bar J is fastened, which finger-bar is provided with guard-fingers $J'$ and brackets $J^2$ to hold the cutter-bar $J^3$, which carries the cutters, the bar being operated by the link $E^4$. The stand $J^4$ is fastened on top of the finger-bar in the shoe $I^2$. This stand and the top of the finger-bar form a groove for the heel of the cutter-bar to traverse in, which has a hole in it for the pivot on the link $E^4$, and the bracket $J^5$ is fastened to the shoe to hold the link to the cutter-bar and hold and keep the pivot in the hole in the cutter-bar while the pitman is worked by the crank; but if the pitman is slipped off of the crank-pin and turned up at a right angle to the cutter-bar the pivot may be slipped out or unhooked from the cutter-bar.

While the machine is operated and the finger and cutter bars vibrate and follow the undulations of the ground passed over, and also when the finger-bar is turned up to pass from one field to another, the spring-stop $J^6$ is fastened to the stand $J^4$, to prevent the cutter-bar from slipping out when the finger-bar is turned up.

The shoe K is made in the form shown in Fig. 9, to surround the end of the finger-bar, and is fastened to it and provided with a slot for the end of the cutter-bar and cutter to traverse through, against the side of which slot the cutter acts as against a guard-finger to cut the crop, and the rear of the slot is made so large as to leave an open space above and in rear of the cutter-bar for the escape of clogging matter, which, if retained, would bind the cutter-bar and prevent it from working freely.

The divider $K'$ is made in the form shown and fastened to the shoe K. The bolts which fasten the divider to the shoe also fasten the stand $K^2$, which carries the pivot of the grain-wheel $K^3$, which wheel is made with a groove on the inside, between the hub and rim, or with curved spokes, so that the end of the cutter-bar and cutter can work through the shoe into the groove or space between the hub and the rim of the wheel.

The platform L is made in the form shown, with its outer end fastened to the under side of the divider, which extends behind the finger-bar, and its inner end is fastened to the finger-bar by the plate $L'$, as shown in the drawings.

$L^2$ is a curved guide-board, extending from the rear of the divider along the outer edge of the platform, to which it is fastened to the rear edge of the platform. This board guides the grain as it is raked off of the platform so far from the standing grain as to be out of the path of the team in cutting the next swath.

$L^3$ is a curved metal plate fastened to the platform, for one of the outer teeth of the rake to traverse on and prevent the rake-teeth from wearing the platform. This plate extends from the finger-bar entirely across and beyond the rear edge of the platform, and the rear end curves over downward, so that the rake, if moved forward, would slip up over the end.

The rake arch or guide $L^4$ is made in the form shown and fastened to the inner end of the platform and to the shoe $I^2$, and the rake-bow $L^5$ is arranged above the guide, with its ends fastened to the ends of the guide $L^4$.

N is the rake. It vibrates on the pivot $N'$, which is a ball, and the box at the end of the rake is a socket fitted to the ball of the pivot, so that the rake can rock and vibrate as required. The pivot $N'$ is supported by the brace-rods $N^2$, one from the shoe or finger-bar, another from the platform, and the other two from different parts of the rake arch or guide, so that the pivot is moved by the finger-bar and the platform in all their vibrations. The rake N is traversed by the link $N^3$, which connects it to the pin in crank $N^4$ on the hub of the wheel $A^4$, which turns the crank. The head of the crank-pin is a ball and the box on the link is a socket, so that the link can rock and vibrate in working the rake.

The stand P is made in the form shown and fastened to the rake, and carries the spring-latch $P'$, which is hinged to one end of the stand and vibrates in an upright slot in the other end, and is pressed up by a spring fastened to the stand under it. This latch $P'$ passes over the rake-bow $L^5$ when the rake moves forward, and raises and carries the rake up over the cut and falling grain. Then the latch passes off of the bow and the rake drops onto the rear of the finger-bar at the butts of the grain, when the crank moves the rake back on the arch or guide and over the platform, moving the grain-heads forward sidewise and backward off the rear of the platform, and drops it so far from the standing grain that it is out of the path of the team in cutting the next swath. As the rake passes off of the rear of the platform it is raised up by the guide, and the teeth are lifted out of the gavel without tangling it. As the rake passes back the spring-latch is pressed down by the rear of the bow and passes out from under it, and is raised by the spring, so that as the rake moves forward the latch passes onto the beam and lifts the rake up so that it is carried forward over the cut and falling grain, as before mentioned.

The crank $N^4$ is fitted to turn and traverse on the hub of the wheel $A^4$, and there is a score around the hub of the crank for the end of the bell-crank $P^2$, which vibrates on a pivot in the bar B, and is operated by the lever $P^3$, which lever vibrates on a pivot in a stand fastened to the bar B. This lever $P^3$ extends up near the driver's seat, so that the driver, while the machine is in operation, can traverse the crank on the hub of the wheel and move one of the scores on the outer end of the crank-hub onto the clutch-pin in the wheel-hub, so that the wheel will turn the crank and operate the rake; and when it has removed the gavel, and while the rake is out of the way of the falling grain, the driver can traverse the crank from the clutch-pin and let the rake remain at rest until sufficient grain has been cut to form another gavel, when he can traverse the crank and lock it again and operate the rake to rake off the gavel, thus giving the driver the entire control of the rake, so that he can keep it constantly in operation by the machine, or make it operate at long or short intervals, to adapt it to the grain being cut by the machine.

$P^4$ is the raker's foot-board, fastened to the rear of the frame, and $P^5$ the raker's stand, from which the gavels may be raked from the platform by hand.

The reel-standard Q is fastened to the rear of the divider to support the reel-bearer $Q'$, and the two are provided with two ratchet-plates and connected by a bolt, so that the upper end of the bearer can be set higher or lower.

The lower end of the reel-standard $Q^2$ steps in the rail A, and is supported by the curved stand $Q^3$, fastened to the frame and provided with a series of holes to adjust the standard. The box $Q^4$ is fitted to traverse on this standard, and is fastened by a set-screw. This box has a long hollow hub on it for the short shaft to turn in, which carries the reel-shaft, which short shaft has the pulley R on it, for a band from the pulley $R'$ on the pinion-shaft.

The short shaft is connected to the reel-shaft $R^2$ by a flexible or universsl joint, to allow the shaft to vibrate in connection with the finger-bar and platform. The reel-shaft $R^2$ is made square, and the centers of the reel-frame and the hollow journal or sleeve $R^5$ are fitted to traverse on it. This journal is connected by a rod, S, to the reel-center, so as to traverse the reel on the shaft and always hold it a proper distance from the bearer in all its vibrations.

When the gavels are to be raked from the platform by hand the rake N, rake-bow $L^5$, and link are all taken off or removed, so as to be out of the way of the hand-rake.

To convert this reaping-machine into a mower, the divider, platform, self-raking attachment, reel, and hand-raker's stand are removed, and the machine prepared for mowing by reversing the driver's seat and connecting the revolving track-clearer $S'$ to the shoe K by a bolt, on which it vibrates, as shown in Fig. 10, the adjustable removable runner $S^2$ being applied to the shoe K by a bolt, so that it may be adjusted, attached, or detached whenever it is desirable. The object and purpose of this runner $S^2$ is to run over and press down tangled grass, so as to make it pass between the shoe and the finger next to the shoe, so that the cutters will sever the grass or swath cut from that which is left standing, so that the track-clearer will remove the grass which is cut from that which is left standing. Heretofore, in cutting tangled grass, this shoe would slip along under the grass cut, and it would remain attached to the standing grass, so that the track-clearer slips along under the cut grass without removing it from that left standing, requiring a laborer to follow the machine and separate the cut from the uncut grass, to show the driver where to guide his team in cutting the next swath; hence it is apparent that the runner $S^2$ saves the labor of one man to follow the machine and separate the cut from the uncut grass.

In mowing, the tongue may be left free to vibrate, and the points of the fingers may be raised by depressing $A^5$ and raising the front of the frame, which will permit the finger-bar and cutters to pass easily over rough ground.

To enable the driver, when mowing, to raise the outer end of the finger-bar, I hang the lever T on the heel of the shoe $I^2$ and connect it to the lever T, which vibrates on a bolt in the stand $Q^3$ and extends forward near the driver's seat. This lever $T'$ is provided with a sliding bolt, (shown in Figs. 8, 12, and 13,) which catches in a score in the edge of the stand $Q^3$ to hold the lever in position; and the driver, by seizing the lever and drawing the bolt, can raise the lever $T'$ and depress the lever T, which acts against a lug on the shoe to raise the finger-bar and cutters and hold them the height required, as shown in Fig. 10 in red lines; and the driver can, by means of the lever $H^3$, depress the front and raise the rear of the frame with the cutting apparatus clear of the ground, as shown by red lines in Fig. 11. It is proper to observe that the driving-wheels and the spindles on which they turn are entirely independent of each other, so that the driver can raise one side of the frame without the other by depressing one of the levers $A^5$.

By turning up the finger-bar, as shown in Fig. 14, and connecting it to the rail $A'$ by the brace-rod shown in Figs. 8, 14, and 15, the machine will be mounted on its own wheels, and in order to travel from farm to farm or elsewhere.

Having described my improvements, I make the following claims, to wit:

1. The reversible adjustable driver's seat, with an adjustable reversible standard located on the main frame between the driving-wheels, substantially as described.

2. The plate $C^3$ on the pinion-shaft, provided with two or more handles or arms, and also provided with an eccentric slot or edge, in combination with the pawl, for the purpose of releasing and holding the pawl from the ratchet and releasing the pinion, when desired.

3. The arrangement, in combination with a harvesting-machine having a hinged cutting apparatus and a removable self-raking attachment, of the raker's stand, substantially as described, whereby the attendant is enabled to remove the gavels by hand when the self-raking attachment is removed, as specified.

4. A harvester-frame mounted on two driving-wheels, in combination with the divider $K'$, platform, and finger-bar, hinged to the frame, and combined with a reel which acts independent of the rake, which rake is arranged, substantially as described, so as to move the grain-heads foremost at intervals sidewise and backward over the platform.

5. The combination of a rake and reel independent of the rake on a harvesting-machine with a hinged finger-bar, substantially as described, the rake moving the grain-heads foremost sidewise and backward independent of the reeling mechanism.

6. In combination with a reel arranged to traverse on its shaft, the sleeve $R^5$ and connecting-rod S, which adjusts and holds the reel properly over the cutters throughout all the vibrations of the finger-bar.

WILLIAM N. WHITELEY.

Witnesses:
REUBEN MILLER,
GEO. W. BEMIS.